(12) United States Patent
Mahe

(10) Patent No.: US 10,126,431 B2
(45) Date of Patent: Nov. 13, 2018

(54) DUAL IMAGINE DEVICE

(71) Applicant: COMMISSARIAT A L'ENERGIE ATOMIQUE ET AUX ENERGIES ALTERNATIVES, Paris (FR)

(72) Inventor: Charly Mahe, Saint Paul Trois Chateaux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 44 days.

(21) Appl. No.: 15/516,515

(22) PCT Filed: Oct. 8, 2015

(86) PCT No.: PCT/EP2015/073310
§ 371 (c)(1),
(2) Date: Apr. 3, 2017

(87) PCT Pub. No.: WO2016/055594
PCT Pub. Date: Apr. 14, 2016

(65) Prior Publication Data
US 2018/0224561 A1    Aug. 9, 2018

(30) Foreign Application Priority Data
Oct. 9, 2014 (FR) ..................... 14 59704

(51) Int. Cl.
*G01T 1/169* (2006.01)
*G01T 7/00* (2006.01)
*G01T 1/20* (2006.01)

(52) U.S. Cl.
CPC ............ *G01T 1/169* (2013.01); *G01T 1/2018* (2013.01); *G01T 7/00* (2013.01)

(58) Field of Classification Search
CPC .......... G01T 1/169; G01T 1/2018; G01T 7/00
See application file for complete search history.

(56) References Cited

U.S. PATENT DOCUMENTS 3,129,353 A * 4/1964 Nemes ................... G01N 21/00
313/409
5,514,874 A * 5/1996 Boone ...................... G01T 1/20
250/486.1

(Continued)

FOREIGN PATENT DOCUMENTS

FR    2 664 380 A1    1/1992
FR    2 879 304 A1    6/2006

OTHER PUBLICATIONS

International Search Report dated Nov. 19, 2015 in PCT/EP2015/073310 filed Oct. 8, 2015.

(Continued)

*Primary Examiner* — Christine S Kim
(74) *Attorney, Agent, or Firm* — Oblon, McClelland, Maier & Neustadt, L.L.P.

(57) ABSTRACT

A device for taking an image, including: a body including an image intensifier tube having an optical axis and interacting with an image sensor, and two interchangeable heads having a field of view defined around a viewing axis; one gamma head including a collimator and a scintillator for transforming a gamma ray coming from a gamma radiation source into an ultraviolet ray transmitted to the image intensifier tube; one alpha head including a lens for transmitting an ultraviolet ray generated by an alpha ray coming from an alpha contamination source to the image intensifier tube; and a mechanism for coupling the two heads to the body one at a time, the coupled head having a viewing axis coincident with the optical axis.

17 Claims, 5 Drawing Sheets

(56) References Cited

U.S. PATENT DOCUMENTS

| | | | |
|---|---|---|---|
| 6,313,465 B1 * | 11/2001 | Nittoh | G01T 7/00 250/368 |
| 6,792,070 B2 * | 9/2004 | Sakaida | A61B 6/00 378/62 |
| 2008/0135767 A1 | 6/2008 | Le Goaller | |
| 2015/0090889 A1 * | 4/2015 | Kuroda | G01T 1/2002 250/362 |

OTHER PUBLICATIONS

French Search Report dated Aug. 28, 2015 in FR 1459704 filed Oct. 9, 2014.

Ihantola, Sakari et al., "Principles of UV-gamma coincidence spectrometry," Nuclear Instruments and Methods in Physics Research A, vol. 690, 2012, XP055169874, pp. 79-84.

Lamadie, F. et al., "Alpha Imaging: First Results and Prospects," IEEE Nuclear Science Symposium Conference Record, 2004, vol. 3, XP010822328, pp. 1594-1598.

* cited by examiner

DUAL IMAGINE DEVICE

TECHNICAL FIELD

The present invention relates to an imaging device able to locate both gamma irradiation sources and alpha contamination sources.

PRIOR ART

Gamma imaging devices have been developed since the 1980s, they make it possible to locate at a distance gamma irradiation sources.

The measurement of alpha radioactivity by imaging dates from the 1990s and the imaging devices implemented became competitive in terms of measurement sensitivity in the 2000s.

The two devices have the function of superimposing, on a visible image, gamma or alpha radioactivity sources. The visible image is taken directly by an imaging device, respectively gamma or alpha. The gamma or alpha image is also taken by the same imaging device, respectively gamma or alpha, without moving it. This makes it possible to superimpose the two images that have been taken so as to obtain a final single image on which appears the gamma irradiation sources or the alpha contamination sources.

The visible image may, in an alternative possibility, be taken simultaneously or not by a colour camera, whereas the gamma or alpha image is taken by the gamma or alpha imaging device. It is necessary to ensure that there is no misalignment between the colour camera and the imaging device and to carry out a parallax correction if necessary.

In certain situations, it would be particularly interesting to detect, directly and simply on a same image, gamma irradiation sources and alpha contamination sources. It may be necessary to establish the mapping of gloveboxes or shielded cells, said mapping being essential for preparing decontamination and dismantling phases of radioactive installations.

At present, no imaging device allows this because the two imaging devices operate on different detection principles.

A gamma imaging device such as the Aladin camera comprises, in cascade from the head to the body, a coded mask or pinhole collimator through which penetrates the gamma radiation (electromagnetic radiation), a scintillator, an image intensifier tube, an optical fibre bundle, a photosensitive sensor array (CCD type). When the scintillator receives gamma radiation via the collimator it transforms it into visible light radiation. The scintillator is coupled to the image intensifier tube. The image intensifier tube operates in the visible. It amplifies the visible light radiation emitted by the scintillator. The optical fibre bundle serves to propagate the visible light radiation to the photosensitive sensor (such as a CCD) with an array of pixels. The optical chain only operates in the visible. The photosensitive sensor is coupled to at least one electronic board enabling processing of the electronic signals delivered by each of the pixels of the photosensitive sensor. These processed signals may be sent via a cable to display means.

An alpha imaging device simply comprises, in cascade from the head to the body, a lens transparent to ultraviolet radiation, an image intensifier tube sensitive in the ultraviolet. An optical fibre bundle serves to propagate the ultraviolet radiation to a photosensitive sensor (such as a CCD) with an array of pixels. The optical chain only operates in the ultraviolet. The photosensitive sensor is coupled to at least one electronic board enabling processing of the electronic signals delivered by each of the pixels of the photosensitive sensor. These processed signals may be sent via connection means and a cable to acquisition and processing means. It is known that the detection of alpha radiation is possible by detecting the ultraviolet radiation emitted when nitrogen in the air is excited by the passage of alpha particles. The ultraviolet spectrum corresponds to the preponderant wavelengths comprised between 280 nm and 390 nm. It is sought that the image intensifier tube is not perturbed by background visible light.

DESCRIPTION OF THE INVENTION

The aim of the present invention is to produce a device for taking an image that makes it possible to highlight, in a precise manner, not just one or more gamma radiation sources but also one or more alpha contamination sources situated in a scene observed.

It also has the aim of producing an imaging device, comprising the aforementioned device for taking an image, which makes it possible to detect and to position on a same final image, in a very precise manner, one or more gamma radiation sources and one or more alpha contamination sources situated in a scene, without having to change device and without having to displace it.

To do this, the present invention proposes a device for taking an image having a set of two interchangeable heads including one gamma head and one alpha head, only one of these heads being able to be in a working position at one time. When two images are taken successively while the head has been changed from one image to the other, they are taken with a same viewing axis in so far as the device for taking an image has not been displaced.

More particularly, the present invention relates to a device for taking an image having a body comprising an image intensifier tube having an optical axis and interacting with an image sensor. The device for taking an image comprises, moreover, a set of two interchangeable heads, each of them having a field of view defined around a viewing axis, the set comprising:

one gamma head comprising a collimator and a scintillator for transforming a gamma ray, coming from a gamma radiation source present in a scene and penetrating into the collimator, into an ultraviolet ray transmitted to the image intensifier tube; and one alpha head comprising a lens transparent to ultraviolet radiation for transmitting an ultraviolet ray generated by an alpha radiation, coming from an alpha contamination source present in the scene, to the image intensifier tube, the image intensifier tube being sensitive to ultraviolet radiation coming both from the alpha head and the gamma head. The device for taking an image comprises, moreover, means for coupling the two heads of the set to the body one at a time, the coupled head having a viewing axis coincident with the optical axis of the image intensifier tube, so as to enable, for the gamma head, the ultraviolet radiation coming from the scintillator to reach the image intensifier tube and, for the alpha head, the ultraviolet radiation that has traversed it, to reach the image intensifier tube.

The coupling means are advantageously mechanical. They may be screwing or bayonet coupling means.

In a very simple manner, the change of head may be manual.

In an alternative embodiment, to carry out a more rapid permutation, the change of head may be automatic, the two heads being mounted on a same support integral with the device for taking an image and able to be displaced rotationally and/or translationally.

To reduce the impact of background light noise while images are taken with the alpha head, it is preferable that the image intensifier tube is an image intensifier tube of the type that is blind to ultraviolet rays of solar origin.

The scintillator of the gamma head may advantageously be made of barium fluoride $BaF_2$, which is the favoured material for dual detection with an image intensifier tube of the type that is blind to ultraviolet rays of solar origin. In an alternative embodiment, the scintillator may be made of caesium iodide CsI, bismuth germanate BGO, cadmium tungstate $CdWO_4$, so that the image intensifier tube is sensitive to ultraviolet photons emitted by the scintillator.

The gamma head may possess a collimator of coded mask or pinhole type.

It is preferable that the alpha head comprises, upstream of the objective with respect to the scene, an ultraviolet bandpass filter to favour the elimination of background visible light noise.

To attenuate the gamma rays reaching the device for taking an image outside of its field of view, the body may be equipped with a protective shielding.

It is preferable that the shielding also protects the scintillator of the gamma head, when it is coupled to the body, vis-à-vis gamma radiation reaching the gamma head outside of its field of view.

It is possible to equip the device for taking an image with at least one element directly or indirectly integral with the body, said element being selected from a collimated gamma spectrometry detector, a laser pointer, a colour camera, a non-collimated dose rate measuring device, an orientable laser telemeter. These elements make it possible to give to the device for taking an image other useful functions for the detection and the characterisation of gamma radiation sources and alpha contamination sources.

The present invention also relates to an imaging device comprising the preceding device for taking an image and in addition an acquisition and processing device for acquiring images, connected to the image sensor, a display device connected to the acquisition and processing device for displaying visible images of the scene highlighting one or more gamma radiation sources, and/or one or more alpha contamination sources, which could be present therein.

The present invention also relates to a method for detecting and locating gamma radiation sources or alpha contamination sources using the preceding imaging device, wherein:

a visible image of the scene observed is captured with the imaging device, said visible image is transferred to the acquisition and processing device, where it is memorised, a gamma or alpha image of the scene observed with the device for taking an image is captured, the gamma head or the alpha head being coupled to the body of the device for taking an image, the gamma or alpha image of the scene observed is transferred to the acquisition and processing device, where it is memorised, the gamma or alpha image is superimposed on the visible image to obtain a final visible image.

The present invention also relates to a method for detecting and locating gamma radiation sources and alpha contamination sources, wherein the method described previously is carried out with the exception of the superimposition, and wherein, after the step of capture of the gamma or alpha image of the scene observed, the gamma head or the alpha head is uncoupled from the body, the alpha head or the gamma head is coupled to the body, an alpha or gamma image of the scene observed is captured with the device for taking an image, the alpha or gamma image of the scene observed is transferred to the acquisition and processing device, where it is memorised, the gamma or alpha image and the alpha or gamma image are superimposed on the visible image to obtain the final visible image.

In these methods, the visible image is captured with the device for taking an image provided with the gamma head or the alpha head or the colour camera.

BRIEF DESCRIPTION OF THE DRAWINGS

The present invention will be better understood on reading the description of exemplary embodiments given for purely indicative purposes and in no way limiting, and by referring to the appended drawings in which.

Identical, similar or equivalent parts of the different figures bear the same numerical references in order to make it easier to go from one figure to the next.

DETAILED DESCRIPTION OF PARTICULAR EMBODIMENTS

Figure 1:
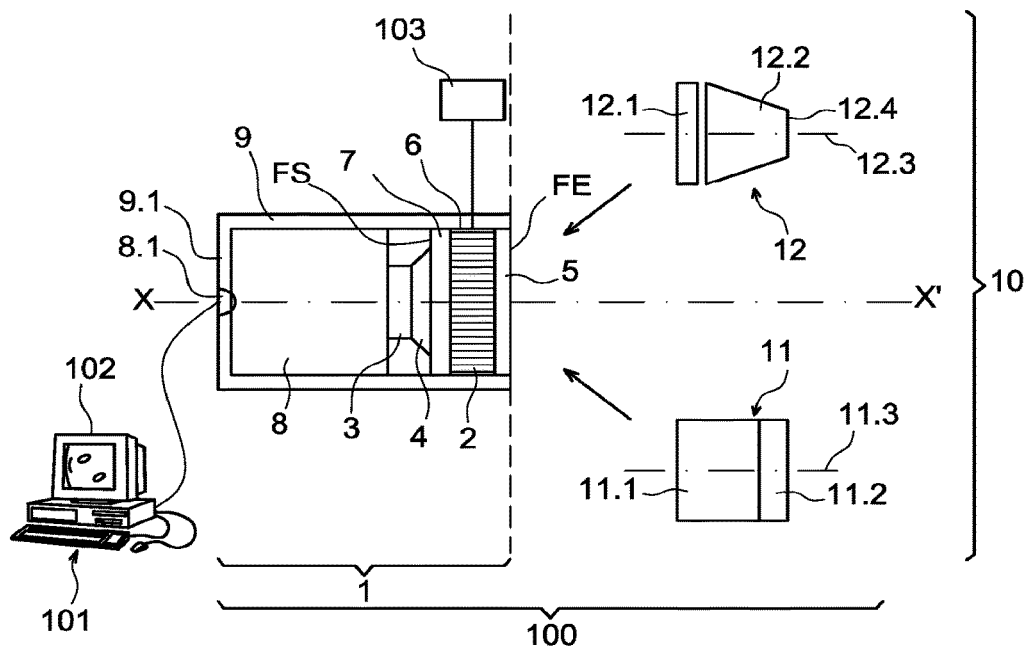
FIG. 1 shows an example of dual imaging device, the subject matter of the invention.

A dual imaging device of a scene observed, the subject matter of the invention, will now be described, with reference to FIG. 1.

It comprises a device for taking an image 100 associated with an acquisition and processing device 101, itself associated with a display device 102. The device for taking an image 100 comprises a body 1 and a set 10 of two interchangeable heads 11, 12. One of the heads 11 is an alpha head that will be used for an acquisition of image of a scene in alpha mode and the other head 12 is a gamma head that will be used for an acquisition of the same scene in gamma mode. The body 1 consists of an envelope 9, an image intensifier tube 2 provided with an optical axis XX', which constitutes the reference viewing axis of the device for taking an image 100.

The image intensifier tube 2 is coupled with a semiconductor image sensor 3, for example of CCD type, through an optical fibre bundle 4. More precisely, the image intensifier tube 2 is sensitive to ultraviolet radiation. It comprises, in cascade from an inlet face FE, a photocathode 5, at least one micro-channel wafer 6 and a luminescent screen 7. The photocathode 5 has the function of converting incident ultraviolet radiation into electrons. The at least one micro-channel wafer 6 has the function of increasing the electronic gain. The luminescent screen 7 has the function of transforming electrons having traversed the micro-channel wafer 6 into visible light. The luminescent screen 7 comprises an outlet face FS turned towards the optical fibre bundle 4. The image sensor 3 is connected to at least one video formatting device 8 of the images delivered by the image sensor 3. This image video formatting device 8 is associated with an electrical supply, not represented. The optical fibre bundle 4, the image sensor 3, the image video formatting device 8 are accommodated in the envelope 9. The envelope 9 comprises a bottom 9.1 at the level of the video formatting device 8. Means for connecting 8.1 the video formatting device 8 are accessible from the outside of the envelope 9.

The imaging device comprises, moreover, an acquisition and processing device 101, which may be realised by the central unit of a personal computer connected via a cable to the image video formatting device 8 and thus indirectly to the image sensor 3, a display device 10, which may be realised by the screen of the personal computer and a device for controlling 103 the image intensifier tube to make its photocathode 5 go from an OFF state to an ON state. The acquisition and processing device 101, the display device 102 and the control device 103 are remote with respect to the device for taking an image 100.

According to a characteristic of the invention, the image intensifier tube 2 is sensitive in the ultraviolet band close to the visible, for example, comprised between around 280 and 390 nm. It will be recalled that the ultraviolet band is comprised between 10 and 400 nm and the visible band extends beyond 400 nm up to around 700 nm.

An image intensifier tube 2 of the type that is blind to ultraviolet rays of solar origin (known as solar blind) is preferably chosen to limit the impact of background light noise during acquisition in alpha mode. These image intensifier tubes 2 are sensitive to radiation of wavelength less than 390 nm. It is obviously possible to use a standard image intensifier tube 2, at the risk of acquiring visible light noise or at the limit of the visible in alpha mode. This noise may be attenuated by an ultraviolet bandpass filter which clips the visible light.

Figure 2A:
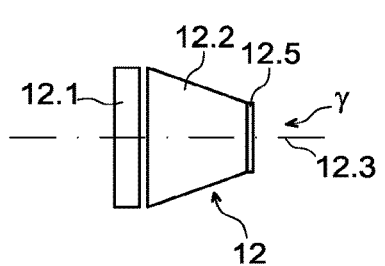
FIGS. 2A, 2B show examples of the gamma head of the dual imaging device, the subject matter of the invention.
Figure 2B:
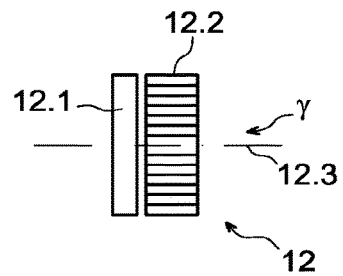

The gamma head 12 will now be described, while referring to FIGS. 1 and 2A, 2B.

The gamma head 12 is constructed around a viewing axis 12.3. It comprises, in cascade, at least two elements. The first element referenced 12.1, which is located downstream with respect to the propagation of the gamma radiation, that is to say on the side of the body 1 when the gamma head 12 is coupled to the body 1, is a scintillator. Said scintillator 12.1 is made of a material that emits ultraviolet rays following the absorption of gamma radiation. These ultraviolet rays will have a wavelength comprised between around 220 and 550 nm as a function of the scintillator used. The image intensifier tube 2 is sensitive to the ultraviolet rays emitted by the scintillator 12.1. It is possible for example for the scintillator 12.1 to be made of barium fluoride $BaF_2$ which emits ultraviolet rays between around 220 nm and 310, cadmium tungstate $CdWO_4$ which emits ultraviolet rays about 475 nm, caesium iodide CsI which emits ultraviolet rays about 550 nm, bismuth germanate BGO which emits ultraviolet rays about 480 nm. The second referenced element 12.2 is a collimator. The collimator 12.2 is located facing the observed scene to image when an image is taken, upstream with respect to the propagation of the gamma radiation. In FIG. 2A, the collimator 12.2 is a pinhole collimator. In FIG. 2B, the collimator 12.2 is a coded mask collimator. The front face of the gamma head 12 is referenced 12.4. It is substantially conical in the alternative embodiment with pinhole type collimator and is substantially flat in the alternative embodiment with coded mask collimator. The alternative embodiment with pinhole type collimator 12.2 makes it possible to obtain an infinite depth of field, the gamma irradiation sources targeted when an image is taken will appear clearly whatever their distance with respect to the device for taking an image 100 without particular focusing being necessary. The alternative embodiment with coded mask collimator 12.2 has a greater sensitivity than that with pinhole collimator 12.2.

Figure 3:
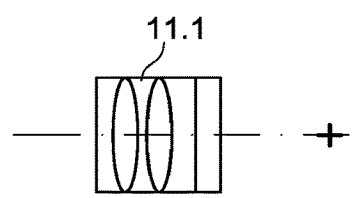
FIG. 3 shows an example of alpha head of the dual imaging device, the subject matter of the invention.

The alpha head 11 is also constructed around a viewing axis 11.3. Reference is made to FIG. 3 in combination with FIG. 1. It mainly comprises an objective 11.1 including at least one lens. This objective 11.1 is transparent to the ultraviolet radiation emitted when nitrogen in the air is excited by the passage of alpha particles. The ultraviolet photons that are going to traverse it have a wavelength less than around 390 nm. It is possible to place, upstream of the objective 11.1, on the side of the scene to observe, an ultraviolet bandpass filter 11.2 favouring the attenuation of background visible light noise.

The device for taking an image 100, the subject matter of the invention, comprises, moreover, means for coupling 20 the heads 11 or 12 to the body 1 one at a time and thus to the image intensifier tube 2.

Indeed, when the gamma head 12 is coupled to the image intensifier tube 2, a gamma image of the scene observed may be taken so as to detect the presence of gamma irradiation sources.

When the alpha head 11 is coupled to the image intensifier tube 2, an alpha image of the scene observed may be taken so as to detect the presence of alpha contamination sources.

The body 1 of the device for taking an image 100 is not displaced during the successive taking of a gamma image and an alpha image. Only the head 11 or 12 is coupled to the body 1, corresponding to the type of image of the scene that it is wished to acquire.

In order to be able to locate alpha contaminated sources and/or gamma irradiation sources, it is preferable to take a visible image of the scene to observe and to superimpose the visible image and the gamma image taken with the gamma head 12 and/or the alpha image taken with the alpha head 11 to obtain an exploitable final visible image. The superimposition of the two images or of the three images is performed by the acquisition and processing means 101. This visible image may just as easily be taken by the device for taking an image 100 when the alpha head 11 is coupled to the body 1 or when the gamma head 12 is coupled to the body. It is thus possible to take the visible image with the head 11 or 12 which is coupled to the image intensifier tube 2 firstly during an image taking sequence. With the device for taking an image, the subject matter of the invention, the same scene will indeed be taken, whatever the image that is taken: visible image, alpha image or gamma image. The acquisition and processing means 101 may consist of specific software enabling images to be acquired. This software makes it possible to obtain final images in real time or practically in real time or retrospectively. It may make it possible to carry out additional calculations, notably from measurements made with the associated additional elements described in FIG. 8.

The gamma head 12 moreover comprises an obturator 12.5, which is closed while a gamma image is being taken and which is open while a visible image is being taken. It has been represented on the front face of the gamma head 12 uniquely in FIG. 2A so as not to overburden the figures. An obturator is not necessary in the alpha head.

Figure 4A:
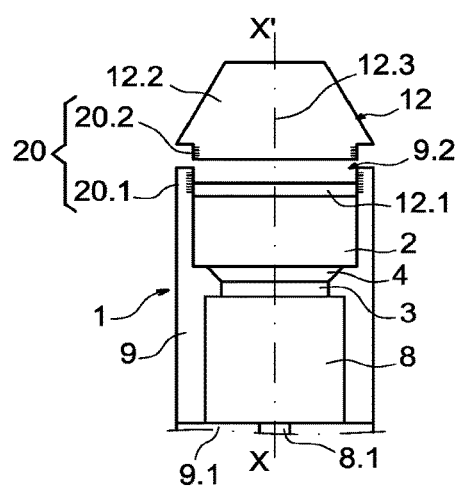
FIGS. 4A, 4B show an example of the device for taking an image, the subject matter of the invention, with manual mechanical coupling means.
Figure 4B:
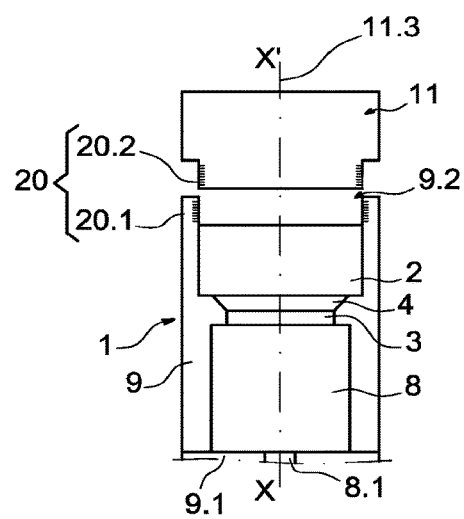

Reference is made to FIGS. 4A, 4B. In this embodiment, the two heads 11, 12 may be switched around and are manually removable from the body 1. In this embodiment, the envelope 9 comprises, opposite the bottom 9.1, an open end 9.2.

The coupling means 20 are mechanical and manual, they consist of a device for fastening by screwing to the body 1. This fastening device is broken down into a female thread 20.1 (tap) and a male thread 20.2 (or external thread). The female thread 20.1 is borne by the envelope 9, more precisely by its internal wall, at the edge of its open end 9.2. The male thread 20.2 (or external thread) is borne by each of the heads 12, 11. The male thread 20.2 is borne by the external peripheral surface of each of the heads 12, 11. This male thread 20.2 is located preferably on the collimator 12.2 of the gamma head 12. The scintillator 12.1 is then exempt of thread and is accommodated inside a space delimited laterally by the two threads 20.1, 20.2 once screwed together, upstream by the collimator 12.2, and downstream by the image intensifier tube 2. The version with the gamma head 12 is represented in FIG. 4A and that with the alpha head 11 is represented in FIG. 4B. For the alpha head 11, the male thread 20.2 is borne by the objective 11.1. The bandpass filter is not shown.

The head 12, 11, whether it is gamma or alpha, when it is fastened to the body 1, has its viewing axis 12.3, 11.3 which is coincident with the optical axis XX' of the image intensifier tube 2. The fastening of one of the heads 11 or 12 is assured manually by screwing one and only one of the two heads 11 or 12 to the body 1 of the device for taking an image 100.

Figure 5:
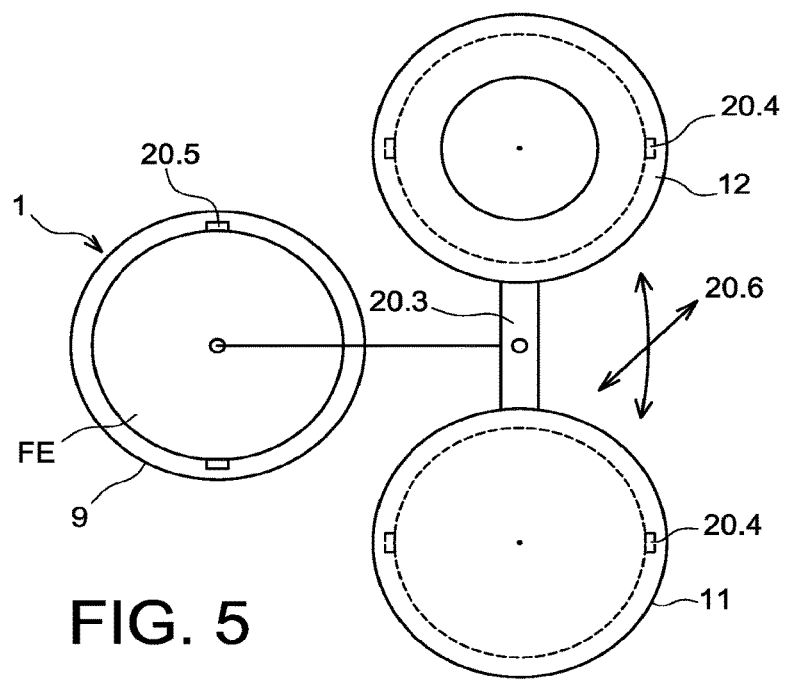
FIG. 5 shows an example of the device for taking an image, the subject matter of the invention, with automatic mechanical coupling means.

It is also possible to envisage using mechanical coupling means 20, but which could be automated instead of being manual. Reference is made to FIG. 5, which is a front view of the device for taking an image. The gamma head 12 is a head with pinhole type collimator. The coupling means 20 still comprise the device for fastening 20.4, 20.5 one of the heads 11 or 12 to the body 1. It comprises, moreover, a support 20.3 for the heads 11, 12, means 20.6 for displacing the support 20.3, rotationally and/or translationally, such as one or more motors. The two heads 11, 12 are integral with said support 20.3 able to be displaced rotationally and/or translationally. The support 20.3 is integral with the device for taking an image.

During the displacement of the support 20.3, one of the heads 11, 12 finishes by finding itself in a position where it may be fastened to the body 1. The fastening device 20.4, 20.5 may be a bayonet fastening comprising at least two lugs 20.4 on the head 11, 12 and at least two slots 20.5 on the body 1 at the level of the envelope 9. Fastening by screwing may also be envisaged in this configuration of mechanical and automated coupling means 20. The bayonet fastening device may also be used in the manual coupling means. In this configuration also, the viewing axis 11.3, 12.3 of the head 11, 12 which is fastened to the body 1 is coincident with the optical axis XX' of the image intensifier tube 2. The axes are limited to points in this FIG. 5.

The image taking frequency obviously depends on the speed of removal of one of the heads and the putting in place of the other. With automated mechanical coupling means, higher frequencies may be reached.

Figure 6A:
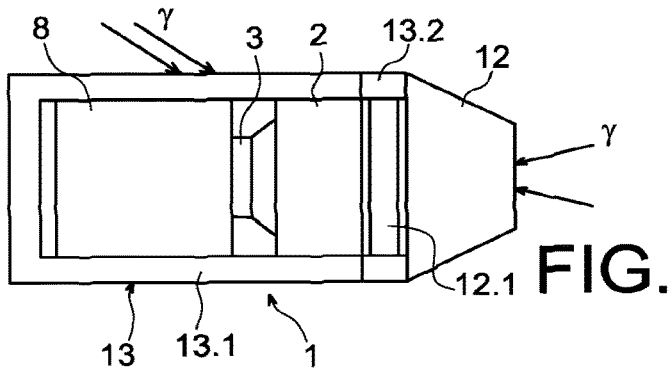
FIGS. 6A, 6B show an example of the device for taking an image, the subject matter of the invention, equipped with a shielding and either with the gamma head or with the alpha head for use in an irradiating environment.
Figure 6B:
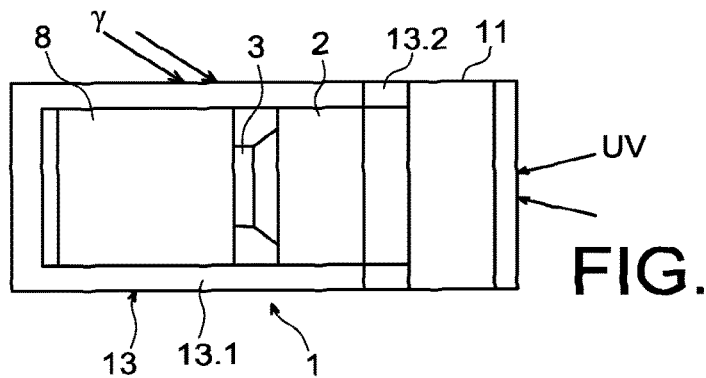

In order that the imaging device can be used when the surrounding gamma irradiation is strong, it is preferable to provide that the body 1 of the device for taking an image is shielded vis-à-vis background irradiation. The envelope 9 of the device for taking an image may serve as shielding if it is made of a material having satisfactory radiation blocking ability. These are materials having a high density, such as lead, tungsten or alloys thereof and notably the tungsten based alloy known as Dénal (registered trademark). This embodiment is visible in FIG. 8. In an alternative embodiment, the envelope 9 may be surrounded by a removable external cladding 13, which serves as shielding, as illustrated in FIGS. 6A, 6B. Several claddings 13 of different thicknesses may thus be provided, chosen depending on the more or less important activity of the irradiation sources.

In an irradiating environment, the shielding 13 serves to protect the electronic components of the body 1, such as the image intensifier tube 2 and the gamma irradiation image sensor 3. It attenuates the gamma radiation that reaches the device for taking an image outside of the field of view of the head 11 or 12 used. It is preferable that the gamma head 12 is also protected at the level of its scintillator 12.1 against gamma radiation, as represented in FIG. 6A, when it is coupled to the body 1. The field of view in gamma mode is thus limited and the impact of parasitic gamma sources situated outside of the field of view of the gamma head 12 is reduced. The shielding 13 surrounds the scintillator 12.1 when the gamma head 12 is coupled to the body 1. In the version where each head 12, 11 must be screwed individually to the body 1, the shielding 13 may extend up to the female thread 20.1 surrounding the body 1, for example. FIG. 6B, represents the device for taking an image 100 with the shielding 13 and the alpha head 11 coupled to the body 1. In an alternative embodiment, it is possible that the shielding 13 is modular with a main part 13.1 around the body 1 and an additional crown-shaped part 13.2 placed around a part of the head, notably the scintillator 12.1 of the gamma head 12 when the latter is coupled to the body 1.

Figure 7A:
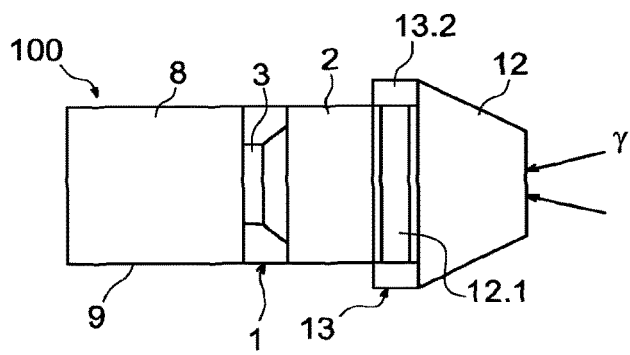
FIGS. 7A, 7B show an example of the device for taking an image, the subject matter of the invention, equipped with reduced shielding and the gamma head or the alpha head, and without shielding for use in a non-irradiating environment.
Figure 7B:
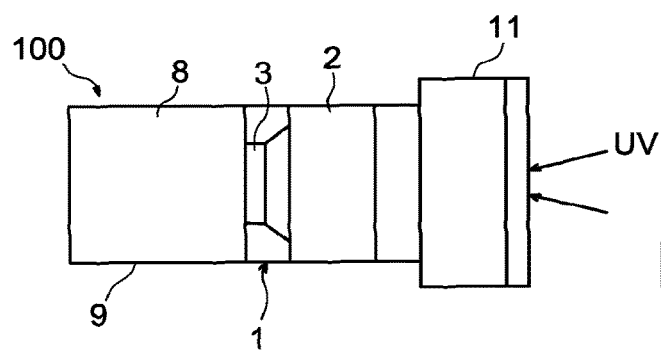

When the environment in which the dual imaging device is located is non-irradiating, shielding may not be used around the body 1, notably if the imaging device is for acquiring an image of alpha contamination sources (FIG. 7B). The dual imaging device is lighter and easier to handle without shielding. Nevertheless, in an application of detection of gamma irradiation sources, without background irradiation, it could be provided to place a shielding crown 13.2 around the scintillator 12.1, as illustrated in FIG. 7A, so as to only take into account the gamma radiation in the field of view of the gamma head.

It is possible, moreover, that the dual imaging device, the subject matter of the invention, is equipped with a collimated gamma spectrometry detector 30, directly or indirectly integral with the body 1. The collimated gamma spectrometry detector 30 has a field of view extending around an axis 32, which is parallel to the optical axis XX' of the image intensifier tube 2. Such a collimated gamma spectrometry detector 30 may be similar to that described in the patent application FR 2 879 304 of the same applicant.

The gamma spectrometry collimator 31 is made of dense material, its density will be greater than that of steel. This material may for example be based on lead and/or tungsten and/or copper. The collimator 31 is integral with the body 1 of the device for taking an image.

The dual imaging device, the subject matter of the invention, may also be equipped, as described in the aforementioned patent application, with a laser pointer 33. The laser pointer 33 is coupled with the collimated gamma spectrometry detector 30. It is directly or indirectly integral with the body 1 of the device for taking an image. It may be placed inside the gamma spectrometry collimator 31 or outside.

The laser pointer 33 has a viewing axis 34 which is parallel to the optical axis XX' of the image intensifier tube 2 and it is pointed towards the scene to image.

As has been described above, the visible image taken by the device for taking an image 100, when one of the heads 11 or 12 is coupled to the body 1, is a monochrome image, which results in a black and white image at the level of the display device 102. It is possible to provide the dual imaging device, the subject matter of the invention, with an auxiliary device for taking an image of colour camera type 35, directly or indirectly integral with the body 1 of the device for taking an image. The device for taking an image may be qualified as main device for taking an image. This colour camera 35 has a viewing axis 36 which is parallel to the optical axis XX' of the image intensifier tube 2, it is pointed towards the observed scene to image 400. This colour camera 35 may be similar to that described in the aforementioned patent application.

The image taken by the colour camera 35 and that of gamma type or alpha type taken by the main device for taking an image 100, whether it is equipped with the gamma head 12 or the alpha head 11, may be substantially simultaneous.

The visible image taken by the colour camera 35 is then superimposed with that of gamma or alpha type taken by the device for taking an image 100 provided with one of the gamma or alpha heads 12 or 11 and potentially with, in addition, that of alpha or gamma type taken by the device for taking an image 100 provided with the other alpha or gamma head 11 or 12. A colour image of the scene observed 400 is thus obtained, on which appear, in a visible and precise manner, the gamma irradiation sources 410 and/or alpha contamination sources 420 present.

It is possible, moreover, to provide the imaging device, the subject matter of the invention, with a non-collimated dose rate measuring device 37 at the periphery of the imaging device. It mainly comprises a probe-holder 38 directly or indirectly integral with the body 1 of the dual imaging device, a probe for measuring 39 the dose rate, intended to be borne by the probe-holder 37, and external measuring means 40 connected to the dose rate measuring probe 37 by electrical conductors.

It is also possible to provide the dual imaging device, the subject matter of the invention, with an orientable laser telemeter 42 to determine the distance of each gamma irradiation source or each alpha contamination source of the scene observed from the dual imaging device. The information of distance of each source from the dual imaging device is used to determine the activity of these sources. A source being located on an image displayed by the display device, the laser beam of the laser telemeter 42 is oriented onto the latter while following it on the display device. The laser beam is reflected by the irradiation or contamination source and the laser telemeter 42 then provides its distance. With this distance, it is possible to determine the activity of the irradiation or contamination source.

Figure 8:
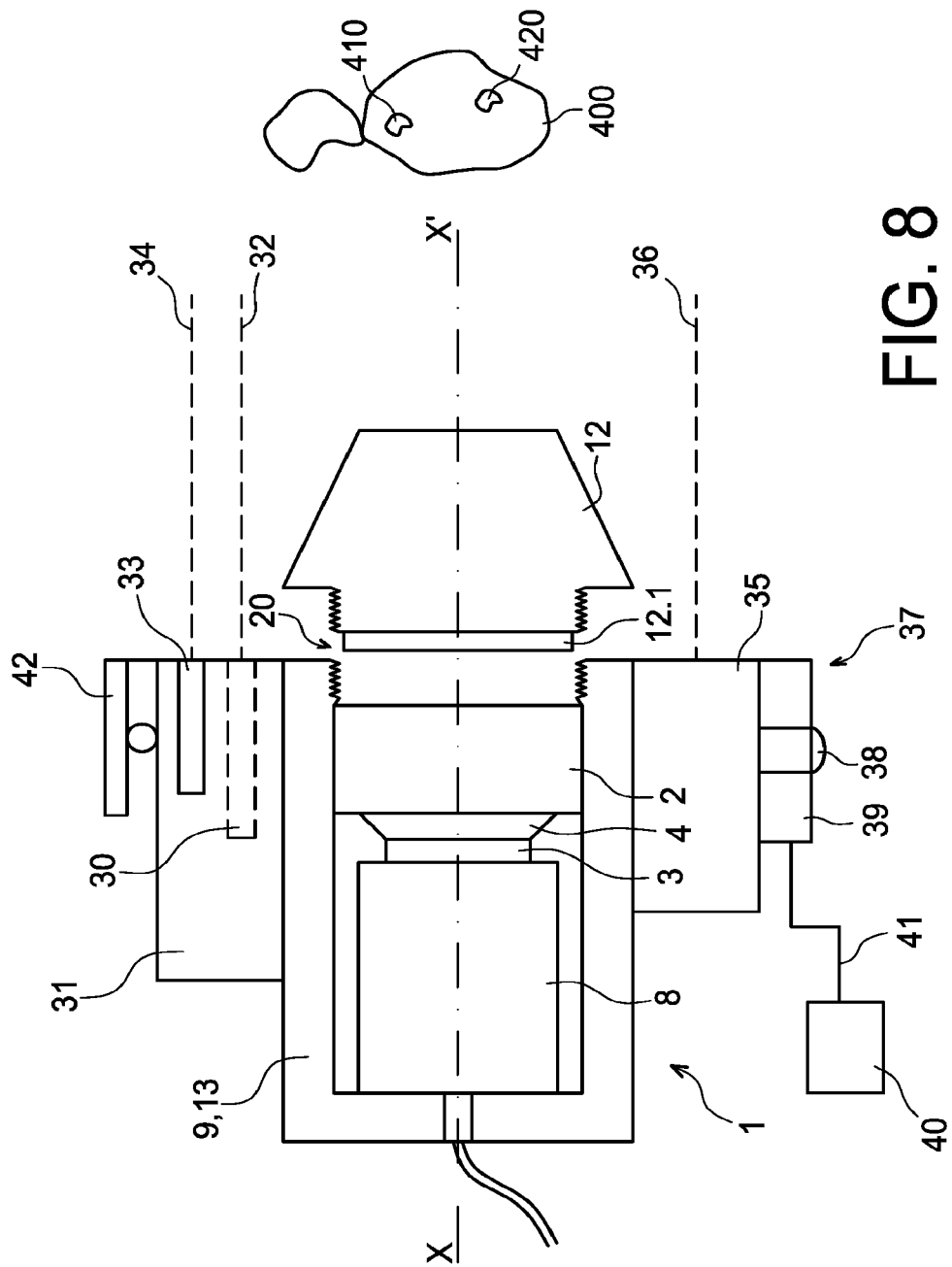
FIG. 8 shows an example of device for taking an image equipped with at least one colour camera.

An operating mode of the imaging device, the subject matter of the invention, will now be described while referring to FIGS. 1, 8 and 9. Firstly, a visible image of the scene observed is captured with the dual imaging device. This image is transferred to the acquisition and processing device 101, where it is memorised.

This image may be taken by the auxiliary imaging device, that is to say the colour camera 35, or instead by the main device for taking an image 100 in so far as it is equipped with one of its heads 11 or 12.

A gamma or alpha image of the scene observed is captured with the device for taking an image 100, the gamma head 12 or the alpha head 11 being coupled to the body 1 and thus to the image intensifier tube 2. Said gamma or alpha image is transferred to the acquisition and processing device 101, where it is processed and memorised. The processing leads to a representation of gamma irradiation sources or alpha contamination sources that are present in the scene observed. The processing may be a filtering. If it is only desired to locate the gamma irradiation sources or the alpha contamination sources, the visible image is superimposed on the gamma image or the alpha image. The two images are applied over each other, making them coincide so as to obtain a final visible image showing the gamma irradiation sources or the alpha contamination sources. This superimposition is performed in the acquisition and processing device 101. The final visible image is displayed in the display device 102. If the visible image has been taken by the colour camera 35, a parallax correction is carried out during the superimposition, since the colour camera 35 has a viewing axis 36 that is parallel but shifted with respect to the reference viewing axis XX' of the device for taking an image 100.

If it is desired to obtain a final visible image which shows both gamma irradiation sources and alpha contamination sources, the gamma or alpha head 12 or 11 is uncoupled from the body 1, it is replaced by the alpha or gamma head 11 or 12. An alpha or gamma image of the scene observed is captured with the device for taking an image 100. This alpha or gamma image is transferred to the acquisition and processing device 101, where it is processed and memorised. The processing leads to a representation of alpha contamination sources or gamma irradiation sources that are found in the scene observed. It may be a filtering.

The visible image is then superimposed with the gamma or alpha image taken first and with the alpha or gamma image taken second. The three images are applied over each other, making them coincide so as to obtain a final visible image showing gamma irradiation sources and alpha contamination sources. This superimposition is performed in the acquisition and processing device 101. The final visible image is displayed on the display device 102. Parallax correction is also carried out on the visible image if it has been taken by the colour camera 35.

Figure 9:
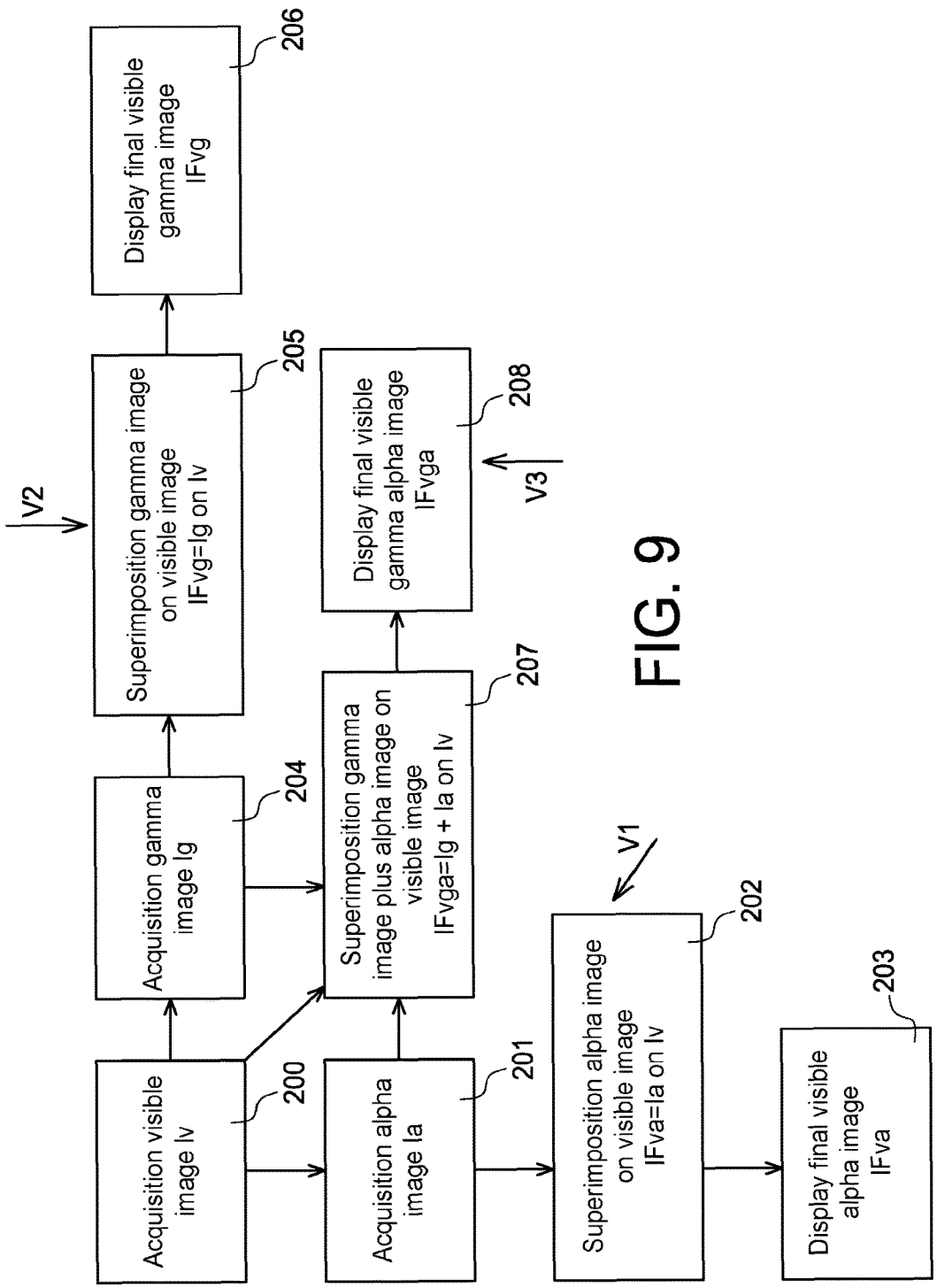
FIG. 9 shows a synoptic of an example of operating mode of the dual imaging device.

In FIG. 9 is represented in a schematic manner a synoptic of an operating mode of the dual imaging device. From the acquisition of a visible image Iv (block 200), a first path V1 has been represented which corresponds to the acquisition of the alpha image Ia (bloc 201), to the superimposition of the alpha image Ia on the visible image Iv to obtain a final visible alpha image IFva (block 202) and to the display of the final visible alpha image IFva (bloc 203). A second path V2 is also represented, which corresponds to the acquisition of a gamma image Ig (bloc 204), to the superimposition of the gamma image Ig on the visible image Iv to obtain a final visible gamma image IFvg (bloc 205) and to the display of the final visible gamma image IFvg (bloc 206). Another path V3 is represented, from the blocks, 200, 201 and 204, the gamma image Ig and the alpha image Ia are superimposed on the visible image Iv to obtain a final visible gamma alpha image IFvga (bloc 207). The final block 208 represents the step of display of the final visible gamma alpha image IFga.

The invention claimed is:
1. A device for taking an image comprising:
   a body comprising an image intensifier tube, having an optical axis, and an image sensor, the intensifier tube interacting with the image sensor;
   a set of heads comprising one gamma head and one alpha head, each of the gamma head and the alpha head having a field of view defined around a viewing axis, the gamma head comprising a collimator and a scintillator for transforming a gamma ray coming from a gamma radiation source present in a scene and penetrating into the collimator into an ultraviolet ray transmitted to the image intensifier tube when the gamma head is coupled to the body, and the alpha head comprising a lens transparent to ultraviolet radiation for transmitting an ultraviolet ray generated by an alpha ray coming from an alpha contamination source present in the scene to the image intensifier tube when the alpha head is coupled to the body; and means for coupling the gamma and alpha heads to the body one at a time, the coupled head from the gamma and the alpha head then having a viewing axis coincident with the optical axis of the image intensifier tube to enable, for the gamma head, the ultraviolet radiation coming from the scintillator to reach the image intensifier tube and, for the alpha head, the ultraviolet radiation that has traversed it to reach the image intensifier tube;

wherein the image intensifier tube being sensitive to the ultraviolet radiation coming both from the alpha head and the gamma head.

2. A device for taking an image according to claim 1, wherein the coupling means is mechanical.

3. A device for taking an image according to claim 2, wherein the coupling means includes screwing or bayonet coupling means.

4. A device for taking an image according to claim 1, wherein the change of head coupled to the body is manual.

5. A device for taking an image according to claim 1, wherein the change of head coupled to the body is automatic, the gamma and alpha heads being mounted on a same support integral with the device for taking an image and configured to be displaced rotationally and/or translationally.

6. A device for taking an image according to claim 1, wherein the image intensifier tube is an image intensifier tube that is blind to ultraviolet rays of solar origin.

7. A device for taking an image according to claim 1, wherein the scintillator of the gamma head is made of barium fluoride $BaF_2$, cadmium tungstate $CdWO_4$, caesium iodide CsI, or bismuth germanate BGO.

8. A device for taking an image according to claim 1, wherein the collimator of the gamma head is one of a collimator of coded mask and of a collimator of pinhole type.

9. A device for taking an image according to claim 1, wherein the alpha head comprises, upstream of an objective with respect to the scene, an ultraviolet bandpass filter.

10. A device for taking an image according to claim 1, wherein the body includes a protective shielding vis-á-vis gamma radiation reaching it outside of the field of view of the head, which is coupled thereto.

11. A device for taking an image according to claim 10, wherein the shielding also protects the scintillator of the gamma head, when it is coupled to the body, vis-á-vis gamma radiation reaching the gamma head outside of its field of view.

12. A device for taking an image according to claim 1, further comprising at least one element directly or indirectly integral with the body, the element being selected from a collimated gamma spectrometry detector, a laser pointer, a color camera, a non-collimated dose rate measuring device, an orientable laser telemeter.

13. An imaging device comprising:
a device for taking an image according to claim 1;
an acquisition and processing device to acquire images, connected to the image sensor; and
a display device connected to the acquisition and processing device, to display visible images of the scene highlighting one or more gamma radiation sources and/or one or more alpha contamination sources, which are present therein.

14. A method for detecting and locating gamma radiation sources or alpha contamination sources using an imaging device according to claim 13, wherein:
a visible image of the scene observed is captured with the imaging device;
the visible image is transferred to the acquisition and processing device, where it is memorized;
a gamma or alpha image of the scene observed is captured with the device for taking an image, the gamma head or the alpha head being coupled to the body of the device for taking an image;
the gamma or alpha image of the scene observed is transferred to the acquisition and processing device, where it is memorized;
the gamma or alpha image is superimposed on the visible image to obtain a final visible image.

15. A method for detecting and locating gamma radiation sources and/or alpha contamination sources according to claim 14, wherein the visible image is captured with the device for taking an image provided with the gamma head or the alpha head, or with the color camera.

16. A method for detecting and locating gamma radiation sources and alpha contamination sources using an imaging device according to claim 13, wherein:
a visible image of the scene observed is captured with the imaging device;
the visible image is transferred to the acquisition and processing device, where it is memorized;
a gamma or alpha image of the scene observed is captured with the device for taking an image, the gamma head or the alpha head being coupled to the body of the device for taking an image;
the gamma or alpha image of the scene observed is transferred to the acquisition and processing device, where it is memorized; and
wherein after the capture of the gamma or alpha image of the scene observed,
the gamma head or the alpha head is uncoupled from the body,
the alpha head or the gamma head is coupled to the body,
an alpha or gamma image of the scene observed is captured with the device for taking an image,
the alpha or gamma image of the scene observed is transferred to the acquisition and processing device, where it is memorized,
the gamma or alpha image and the alpha or gamma image are superimposed on the visible image, to obtain the final visible image.

17. A method for detecting and locating gamma radiation sources and/or alpha contamination sources according to claim 16, wherein the visible image is captured with the device for taking an image provided with the gamma head or the alpha head, or with the color camera.

* * * * *

UNITED STATES PATENT AND TRADEMARK OFFICE
CERTIFICATE OF CORRECTION

| | | |
|---|---|---|
| PATENT NO. | : 10,126,431 B2 | Page 1 of 1 |
| APPLICATION NO. | : 15/516515 | |
| DATED | : November 13, 2018 | |
| INVENTOR(S) | : Charly Mahe | |

It is certified that error appears in the above-identified patent and that said Letters Patent is hereby corrected as shown below:

On the Title Page

Item (54) and in the Specification, Column 1 Line 1, the title is incorrect. It should read:
-- DUAL IMAGING DEVICE --

Signed and Sealed this
Fourth Day of June, 2019

Andrei Iancu
*Director of the United States Patent and Trademark Office*